(12) United States Patent
Falicoff et al.

(10) Patent No.: US 8,075,162 B2
(45) Date of Patent: Dec. 13, 2011

(54) ZOOM LUMINAIRE WITH COMPACT NON-IMAGING LENS-MIRROR OPTICS

(75) Inventors: Waqidi Falicoff, Stevenson Ranch, CA (US); Julio C. Chaves, Madrid (ES)

(73) Assignee: Light Prescriptions Innovators, LLC, Altadena, CA (US)

( * ) Notice: Subject to any disclaimer, the term of this patent is extended or adjusted under 35 U.S.C. 154(b) by 325 days.

(21) Appl. No.: 12/584,687

(22) Filed: Sep. 9, 2009

(65) Prior Publication Data

US 2010/0149820 A1     Jun. 17, 2010

Related U.S. Application Data

(60) Provisional application No. 61/191,904, filed on Sep. 12, 2008.

(51) Int. Cl.
*F21S 8/00* (2006.01)
*F21V 17/02* (2006.01)

(52) U.S. Cl. ........ 362/281; 362/277; 362/280; 362/297; 362/304; 362/346; 362/352

(58) Field of Classification Search .................. 362/268, 362/277, 280, 281, 304–305, 307–308, 296.01, 362/296.05, 297, 352
See application file for complete search history.

(56) References Cited

U.S. PATENT DOCUMENTS

| | | | |
|---|---|---|---|
| 2,230,186 A * | 1/1941 | Andrews et al. | 362/291 |
| 3,787,675 A * | 1/1974 | Rushing et al. | 362/307 |
| 4,101,957 A | 7/1978 | Chang | 362/268 |
| 4,293,892 A | 10/1981 | Plummer | 362/17 |
| 4,519,020 A | 5/1985 | Little | 362/268 |
| 4,745,531 A | 5/1988 | Leclercq | 362/281 |
| 4,823,243 A | 4/1989 | Weigert | 362/281 |
| 5,068,768 A | 11/1991 | Kobayashi | 362/61 |
| 5,138,540 A | 8/1992 | Kobayashi et al. | 362/268 |
| 5,243,459 A | 9/1993 | Winston et al. | 359/362 |
| 5,303,125 A | 4/1994 | Miller | 362/32 |
| 5,584,568 A | 12/1996 | Corbasson et al. | 362/268 |
| 5,775,799 A | 7/1998 | Forkner | 362/268 |
| 6,004,007 A | 12/1999 | Weigert | 362/268 |
| 6,092,914 A | 7/2000 | Esakoff et al. | 362/268 |

(Continued)

OTHER PUBLICATIONS

Julio Chaves and Manuel Collares Pereira, "Variable geometry nonimaging optics devices", *Proceedings of the SPIE conference on Nonimaging Optics: Maximum Efficiency Light Transfer VI*, San Diego, California, USA, Jul. 2001.

*Primary Examiner* — Robert May
(74) *Attorney, Agent, or Firm* — Drinker Biddle & Reath LLP

(57) ABSTRACT

A zoomable luminaire has a source of light, a primary reflector with entry and exit apertures, and at least one secondary reflector with entry and exit apertures. The source delivers light into the entry aperture of the primary reflector, and the primary reflector delivers the light at the exit aperture of the primary reflector. The luminaire has a retracted position for producing a beam of a first beam angle, where the primary reflector is nested within the secondary reflector and the secondary reflector does not substantially affect the distribution of the light. The luminaire has at least one extended position for producing a beam of a second width, where the exit aperture of the primary reflector is contiguous with the entry aperture of a secondary reflector so that the light is delivered at the exit aperture of a secondary reflector.

10 Claims, 17 Drawing Sheets

U.S. PATENT DOCUMENTS

| | | | |
|---|---|---|---|
| 6,200,011 B1 | 3/2001 | Miller et al. | 362/554 |
| 6,282,027 B1 | 8/2001 | Hough | 359/618 |
| 6,290,368 B1 | 9/2001 | Lehrer | 362/187 |
| 6,400,905 B1 | 6/2002 | Tenmyo | 396/175 |
| 6,499,862 B1 | 12/2002 | Weigert et al. | 362/268 |
| 6,575,598 B2 | 6/2003 | Weigert et al. | 362/268 |
| 6,688,757 B2 * | 2/2004 | Kovach et al. | 362/352 |
| 6,746,124 B2 | 6/2004 | Fischer et al. | 353/43 |
| 6,764,197 B1 | 7/2004 | Zemar | 362/159 |
| 6,809,869 B2 | 10/2004 | Hough | 359/626 |
| 6,834,982 B2 | 12/2004 | Dedoro | 362/268 |
| 6,986,593 B2 | 1/2006 | Rhoads et al. | 362/308 |
| 7,027,228 B2 | 4/2006 | Mikhailov | 359/623 |
| 7,066,622 B2 | 6/2006 | Alessio | 362/187 |
| 7,172,319 B2 | 2/2007 | Holder et al. | 362/341 |
| 7,192,162 B2 | 3/2007 | Tanaka et al. | 362/268 |
| 7,261,438 B2 | 8/2007 | Alessio | 362/268 |
| 7,295,379 B2 | 11/2007 | Tsai | 359/651 |

* cited by examiner

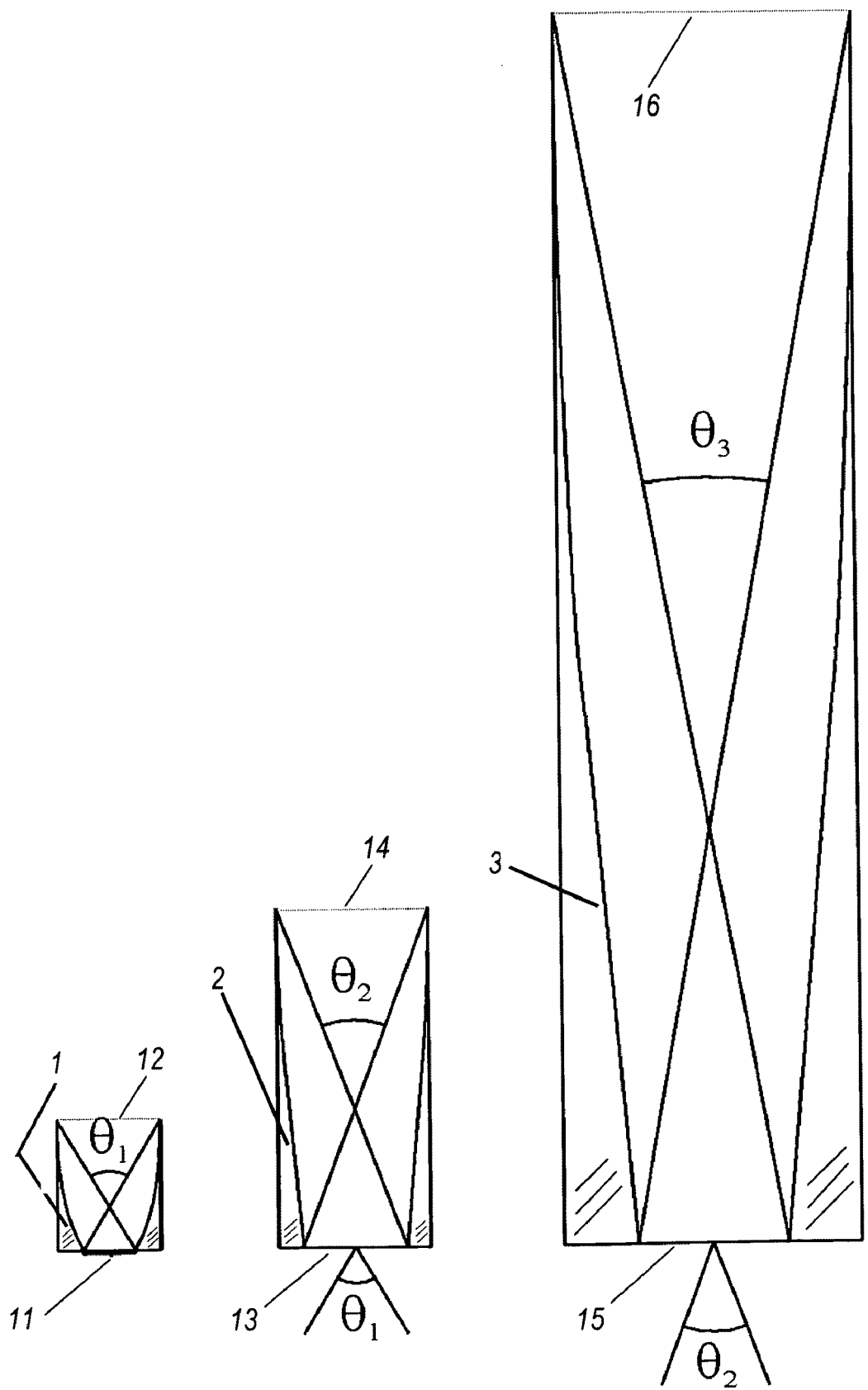
FIG. 1A  FIG. 1B  FIG. 1C

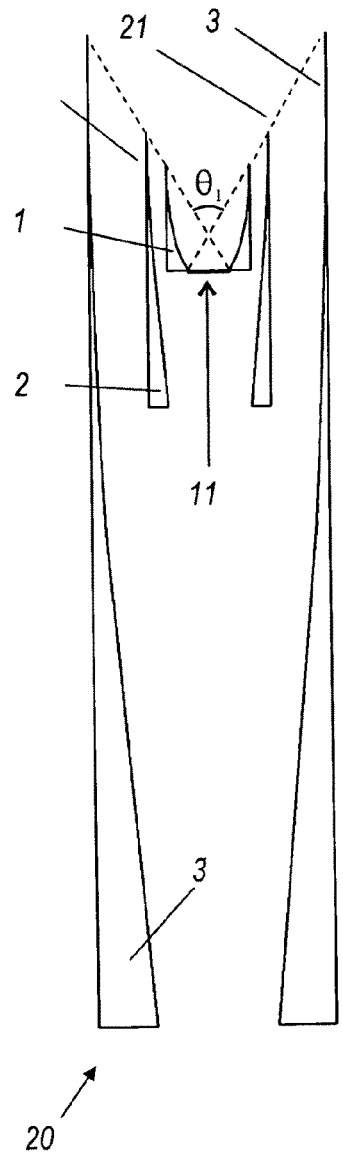
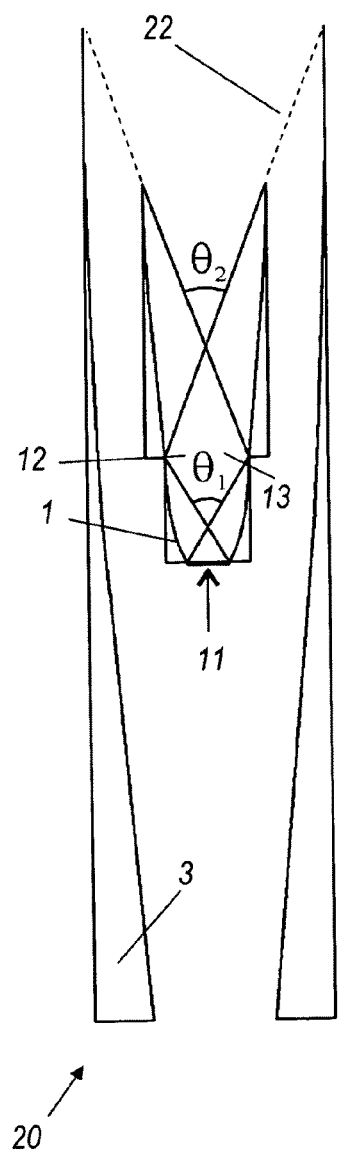
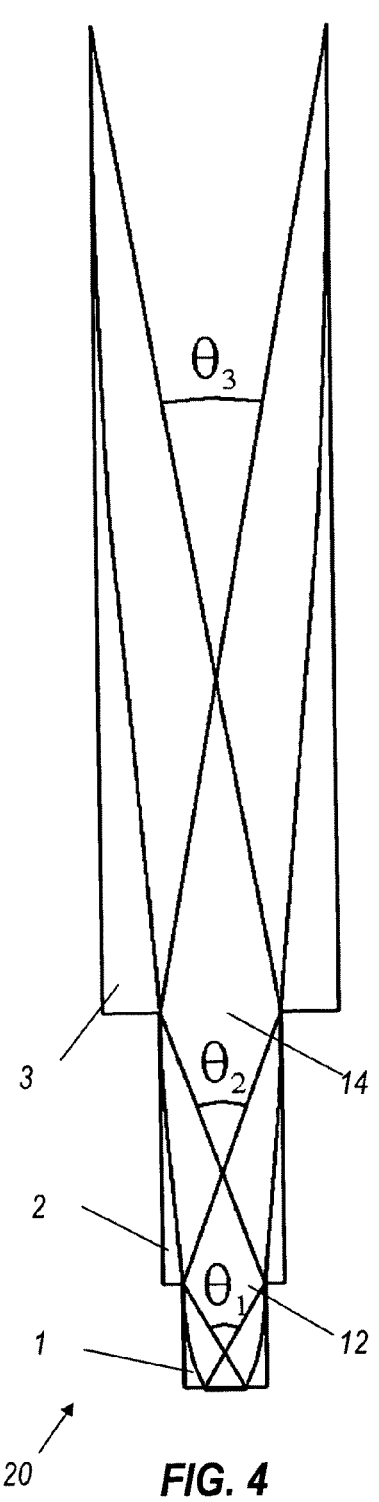
FIG. 2  FIG. 3  FIG. 4

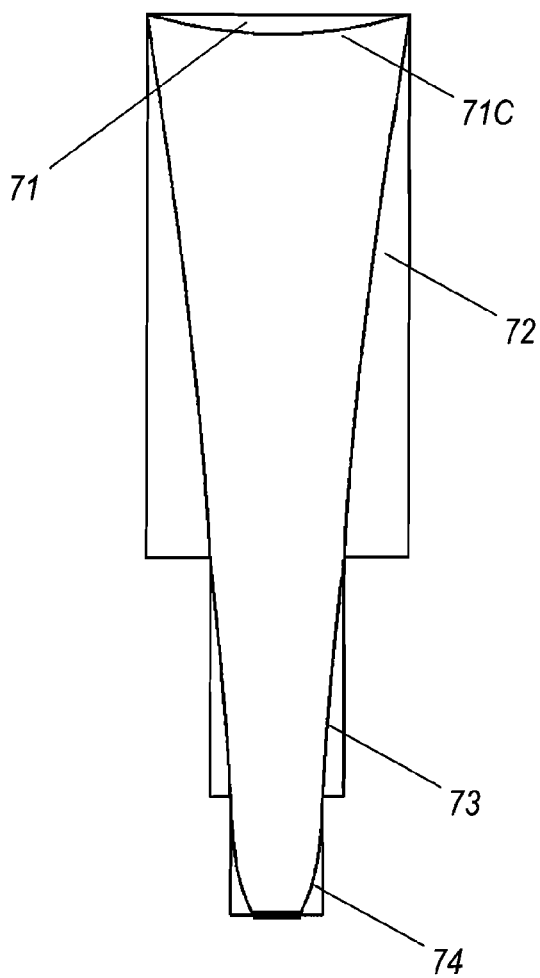
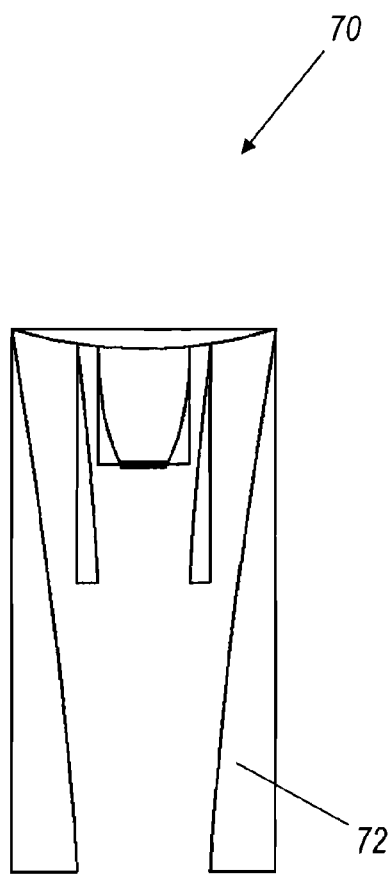
FIG. 7A  FIG. 7B
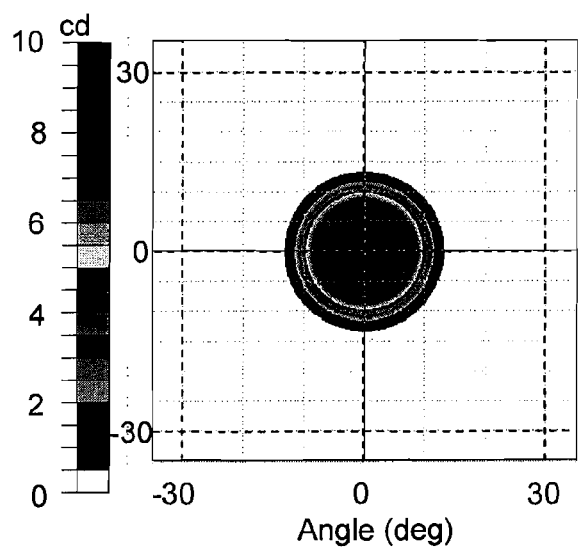
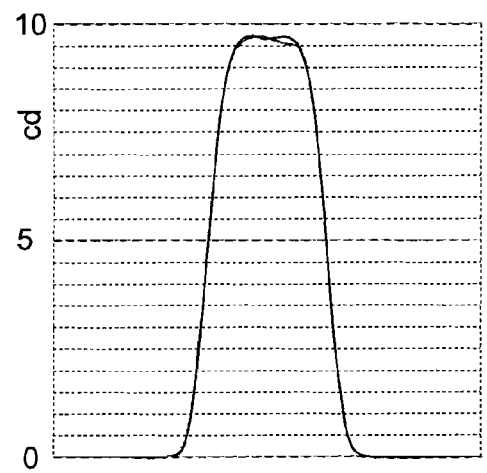
FIG. 8A  FIG. 8B

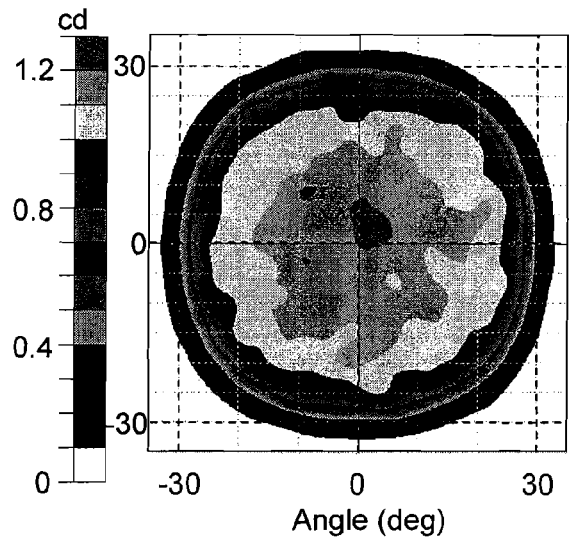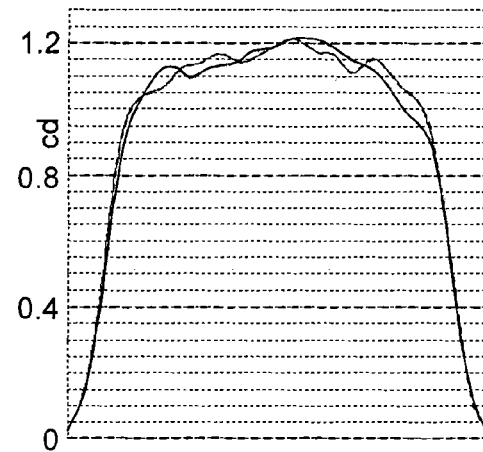
*FIG. 8S*  *FIG. 8T*
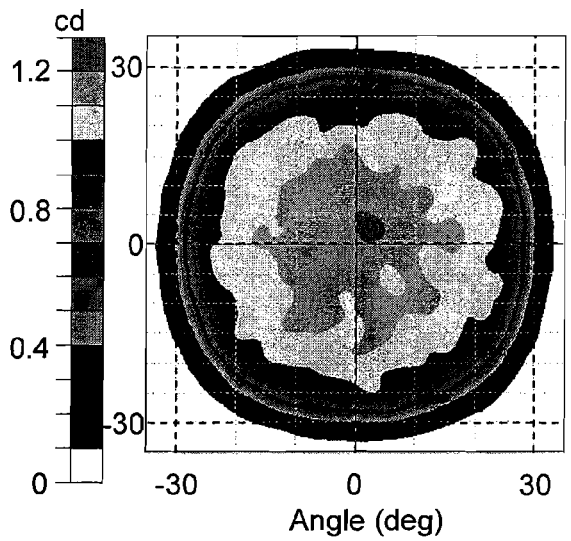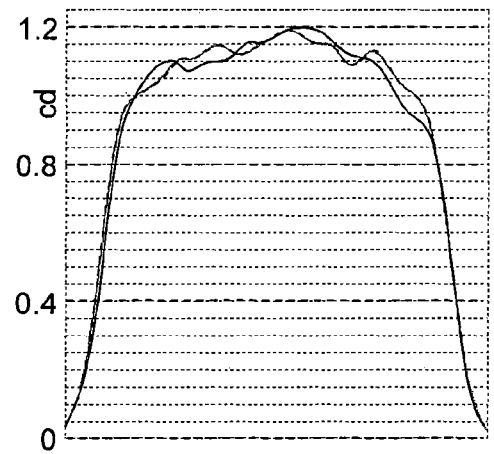
*FIG. 8U*  *FIG. 8V*

ZOOM LUMINAIRE WITH COMPACT NON-IMAGING LENS-MIRROR OPTICS

CROSS REFERENCE TO RELATED APPLICATIONS

This application claims benefit of U.S. Provisional Patent Application No. 61/191,904, filed Sep. 12, 2008 by Chaves and Falicoff, the content of which is herein incorporated by reference in its entirety.

BACKGROUND OF THE INVENTION

Beam-forming luminaires such as flashlights and searchlights sometimes feature a zoom capability, whereby illumination circles of varying size are produced by the movement of some component. An overwhelming commonality is that the moving sub-component is a lens, whether the luminaire is a lens-lens or lens-mirror design. Otherwise, when it is the reflector that moves, it remains a single piece and typically moves relative to the source. Only a portion of the prior art is applicable to light-emitting diodes at all, and those cited utilize imaging lenses for their zoom. Most of the References cited herein relate to incandescent lamps with a reflector and two or more imaging lenses. Nonimaging optics is rarely seen in the prior art of zoom-illumination. The objective of the present invention is to provide a compact wide-ranging nonimaging zoom-luminaire suitable for light-emitting diodes.

SUMMARY OF THE INVENTION

Non-imaging lens-mirror systems are well known, as in U.S. Pat. No. 5,243,459 by Winston & Ning, which discloses various combinations of one or two lenses, some with a generally tubular curved mirror. This approach is optimal for a perfectly uniform source, and will produce a uniform illumination pattern, but it is unable to provide a variable output angle. When a less uniform source is utilized, a flat cone and a simple spherical lens can generate a beam with acceptable non-uniformities, in a much more compact configuration than the relative tall devices of this approach. In contrast, the present invention discloses a unique mirror-splitting approach, particularly well-suited for LEDs, that successfully provides a wide zoom range with good uniformity throughout, in a compact profile. Highly manufacturable preferred embodiments are disclosed herein.

BRIEF DESCRIPTION OF THE DRAWINGS

The above and other aspects, features and advantages of the present invention will be apparent from the following more particular description thereof, presented in conjunction with the following drawings wherein:

FIGS. 1A, 1B, and 1C are diagrams of a CPC and two angle transformers forming an embodiment of a zoomable luminaire.

FIG. 2 is a diagram showing the CPC and angle transformers of FIG. 1 nested, with the angle transformers inactive.

FIG. 3 is a diagram similar to FIG. 2, but showing one angle transformer in an extended, active position.

FIG. 4 is a diagram similar to FIG. 2, but showing both angle transformers in a fully extended, active position.

FIGS. 7A and 7B are diagrams corresponding to FIGS. 5A and 5C of a further embodiment of a zoomable luminaire with a lens.

DETAILED DESCRIPTION OF THE PREFERRED EMBODIMENTS

Figure 5A:
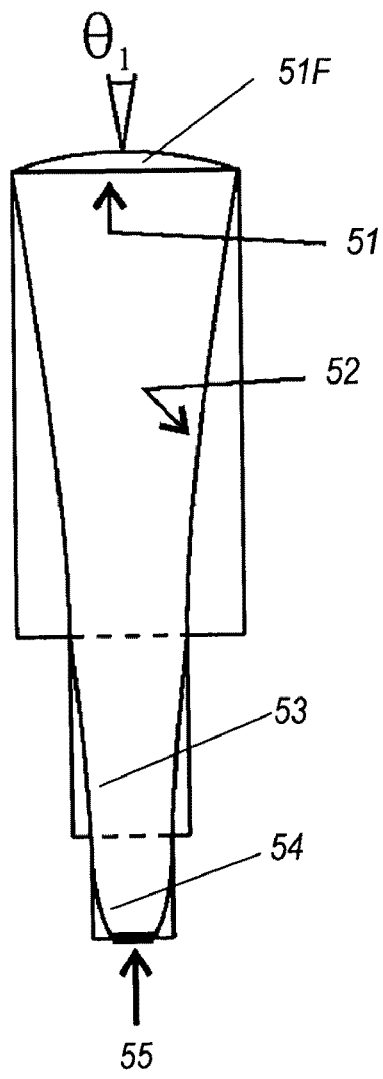
FIGS. 5A, 5B, and 5C are diagrams corresponding to FIGS. 4, 3, and 2 of a zoomable luminaire with a lens.

A better understanding of the features and advantages of the present invention will be obtained by reference to the following detailed description and accompanying drawings, which set forth illustrative embodiments in which the principles of the invention are utilized.

FIG. 1A shows CPC 1, with Lambertian source 11 ($\theta_0=90°$). It produces an angular output $\theta_1$ at aperture 12 (dotted line). FIG. 1B shows a $\theta_1$-$\theta_2$ angle transformer 2 with entry aperture 13 and exit aperture 14. FIG. 1C shows $\theta_2$-$\theta_3$ angle transformer 3, with entry aperture 15 and exit aperture 16, showing how such an optic must grow taller with smaller output angle. In general, an angle transformer is a nonimaging optical device that transforms an input beam with a first angular aperture $\theta_1$ into an output beam with a second angular aperture $\theta_2$. If a $\theta_1$-$\theta_2$ angle transformer 2 is put on top of the CPC 1, they combine to form an optic that puts out a beam of angular aperture $\theta_2$. Again, if a $\theta_2$-$\theta_3$ angle transformer 3 is put on top of the both of them, the output beam has angular aperture $\theta_3$. A principle used in embodiments of this invention is demonstrated by this stacking of these three components into a single zoom luminaire capable of any angular aperture from $\theta_1$ to $\theta_3$.

One embodiment of a zoomable luminaire indicated generally by the reference number 20 comprises the compound parabolic concentrator (CPC) 1 of FIG. 1A and the two angle transformers 2 and 3 shown respectively in FIGS. 1B and 1C. FIG. 2 shows a particular nested arrangement of the luminaire 20, retractably assembled from the components shown in FIGS. 1A, 1B, and 1C and positioned for an output angle $\theta_1$. The light coming out of the source 11 only "sees" (dashed lines 21) the mirrors of the CPC 1. The angle transformers 2 and 3 are retracted sufficiently that light emerging from the CPC 1 misses the reflecting surfaces of angle transformers 2 and 3, and passes directly out of the exit apertures of the angle transformers 2 and 3. The exact position of the angle transformers 2 and 3 is not important. For example, they may be retracted so that their output apertures are flush with that of the CPC 1.

The CPC 1 may be moved down relative to the first transformer 2 to a first extended position, as shown in FIG. 3. In FIG. 3, the exit aperture 12 of the CPC 1 is contiguous with the input aperture 13 of the smaller, $\theta_1$-$\theta_2$ angle transformer 2. The CPC 1 and the smaller angle transformer 2 are given sizes that fit together smoothly. The taller angle transformer 3 is still retracted out of the $\theta_2$ exit beam. In this case the source 11

"sees" (dotted lines 22) the CPC 1 and the smaller angle transformer 2. The light of zoomable luminaire 20 now exits with angular aperture $\theta_2$.

The larger angle transformer 3 of FIG. 1C may also be moved upwards relative to the other two components 1 and 2, forming the second extended, or fully extended configuration shown in FIG. 4. The interior surfaces of CPC 1 and both angle transformers 2 and 3 now form one continuous whole, fitting contiguously end to end. In this case the source 1 "sees" the CPC 1 and both angle transformers 2 and 3. The luminaire exit angle is therefore $\theta_3$.

The angle transformers 2 and 3 shown in FIGS. 1B and 1C may be very tall if a narrow angle $\theta_3$ is desired, and it is in many contexts advantageous to replace them by the combination of a lens and a mirror. Advantageously, lens-mirror combinations are disclosed herein that zoom better than do the mirrors of FIGS. 1 to 4.

Figure 5B:
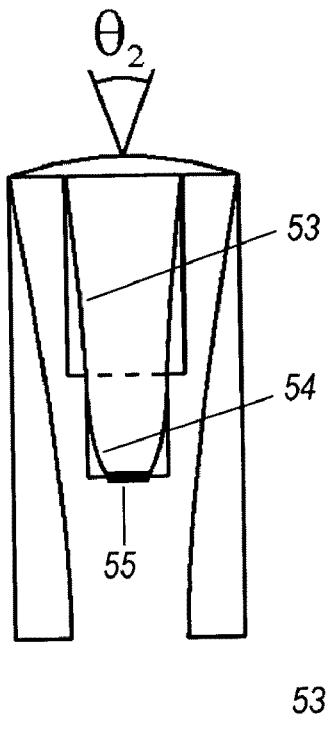
Figure 5C:
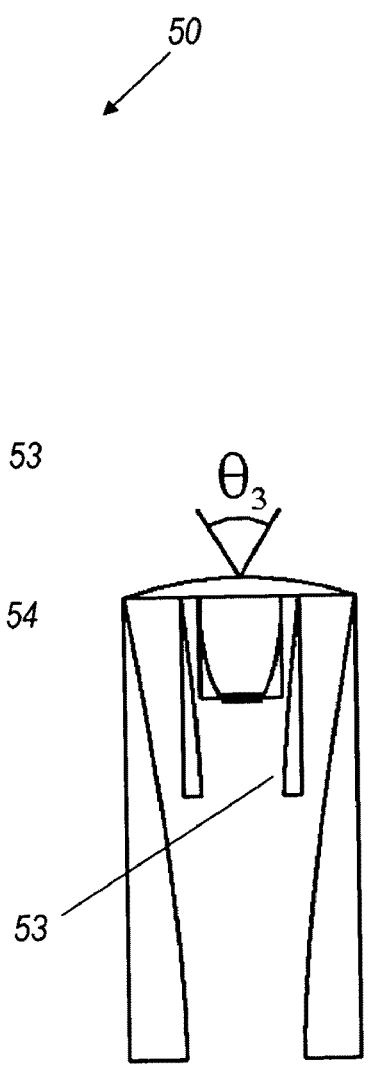

FIGS. 5A, 5B, and 5C (collectively FIG. 5) respectively show a preferred embodiment of such lens-mirror devices, indicated generally by the reference number 50, in the retracted, first extended, and fully extended positions analogous to those of FIGS. 2, 3, and 4. The luminaire 50 comprises a lens 51, two curved mirrors 52 and 53, CPC 54, and a light source 55. In FIG. 5, the lens 51 is mounted with its flat entry surface 51F at the exit aperture of the last, primary mirror 52 and with its convex surface projecting outwards. In any position in which a mirror is inactive, that is to say, in the defined positions other than the fully extended position of FIG. 5A and in any intermediate position between the retracted position of FIG. 5C and the first extended position of FIG. 5B, the mirrors are nested so that the last active mirror abuts the lens 51.

Figure 6A:
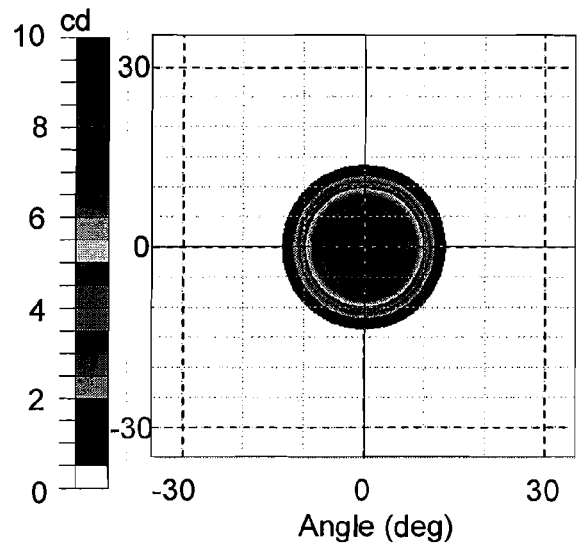
FIGS. 6A through 6T are charts showing in bullseye and graph form the angular distribution of light from the luminaire of FIGS. 5A through 5C at different zoom settings.
Figure 6B:
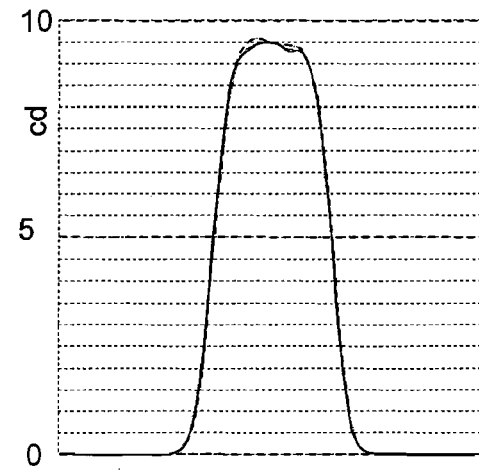
Figure 6C:
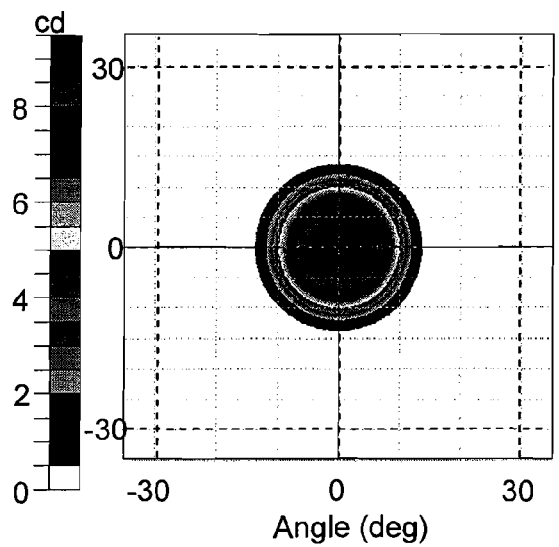
Figure 6D:
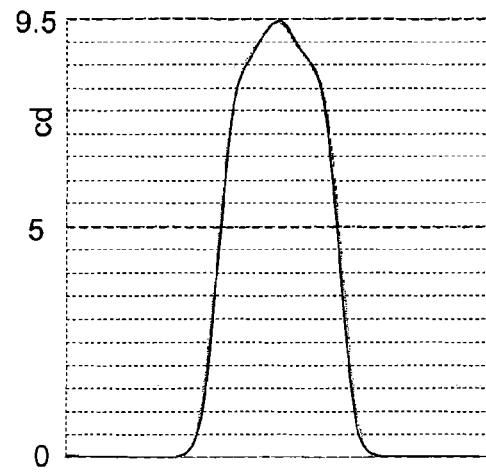
Figure 6E:
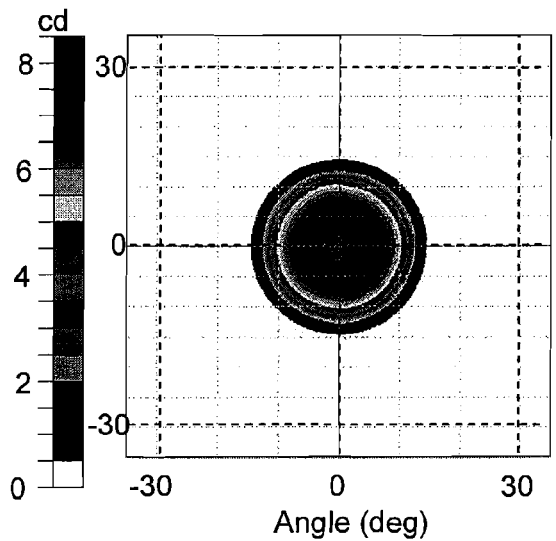
Figure 6F:
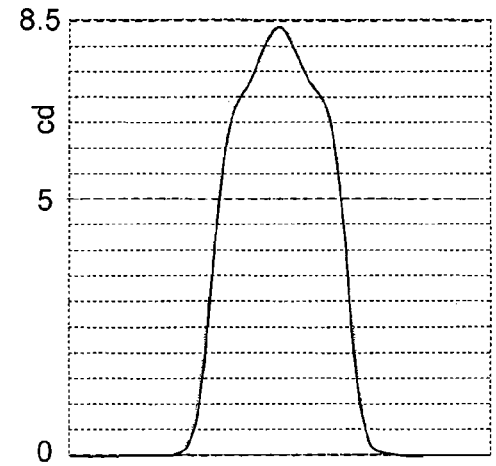
Figure 6G:
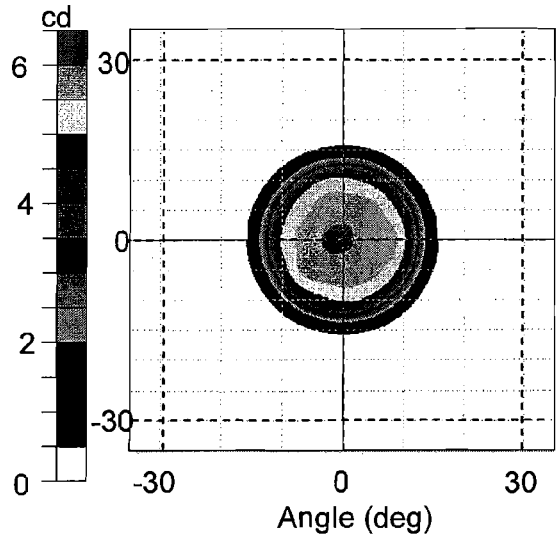
Figure 6H:
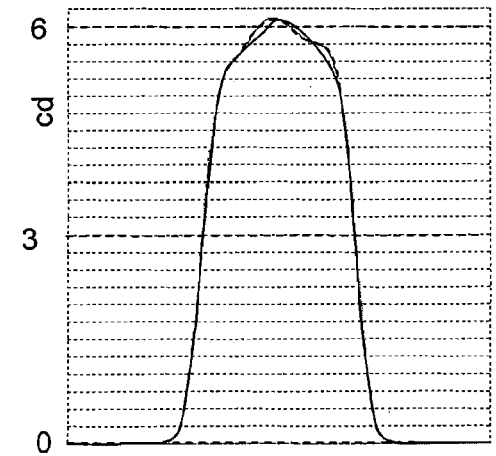
Figure 6I:
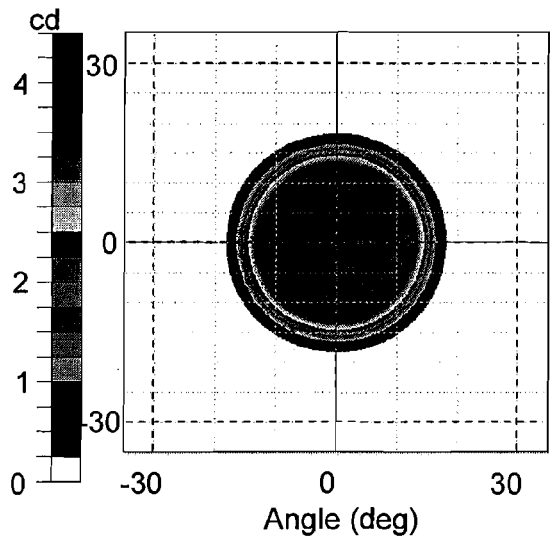
Figure 6J:
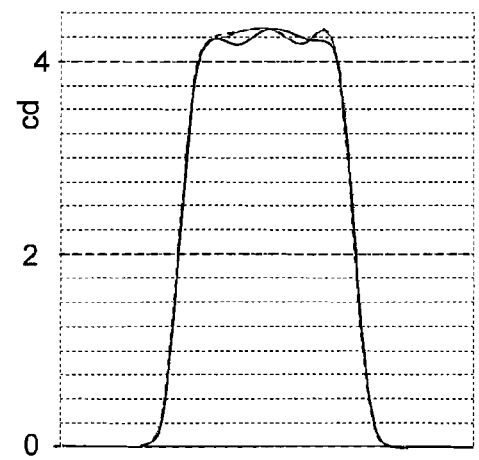
Figure 6K:
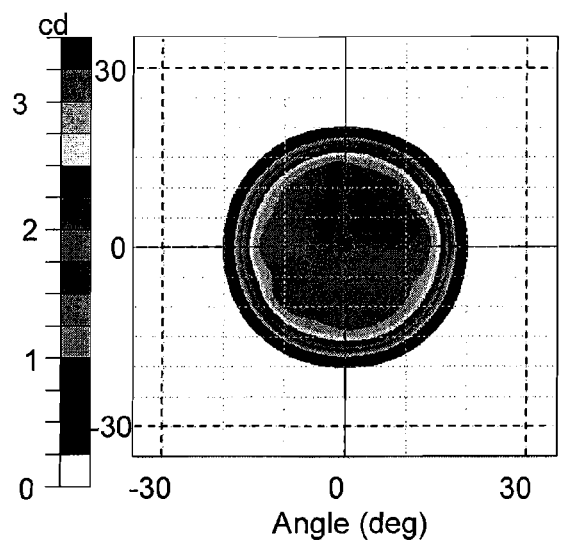
Figure 6L:
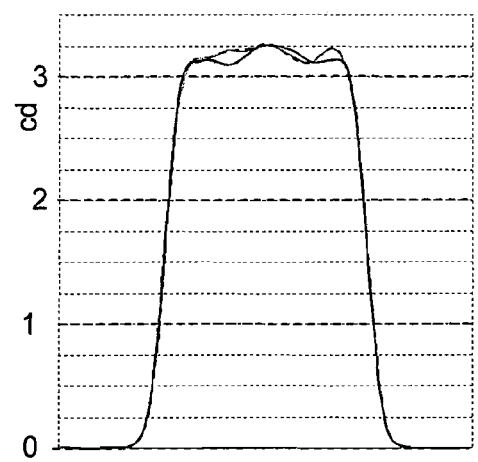
Figure 6M:
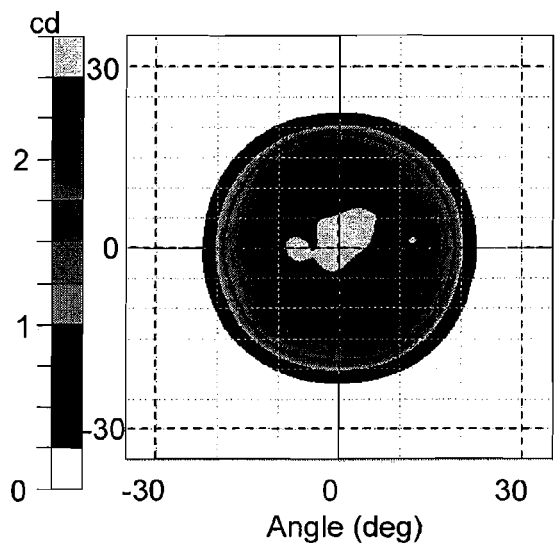
Figure 6N:
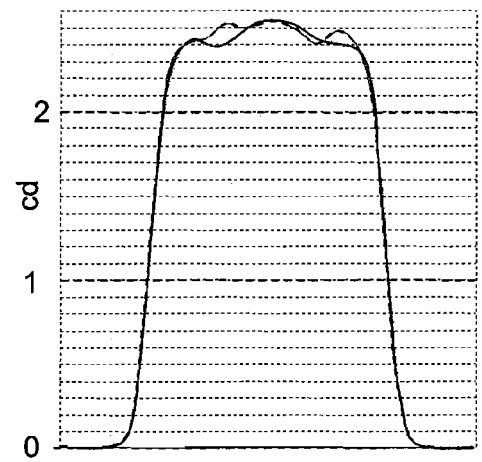
Figure 6O:
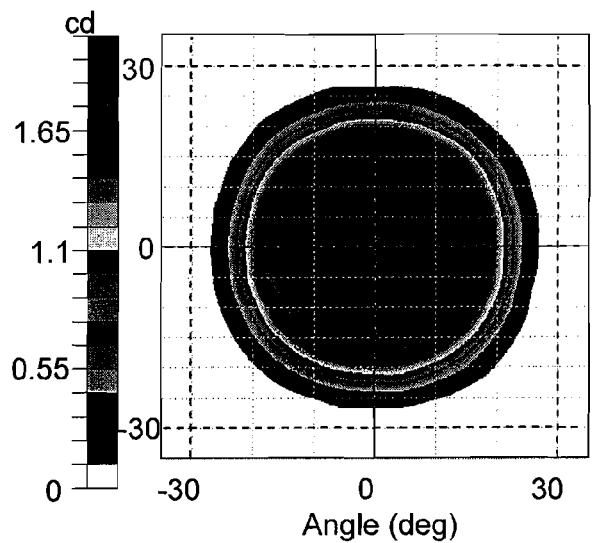
Figure 6P:
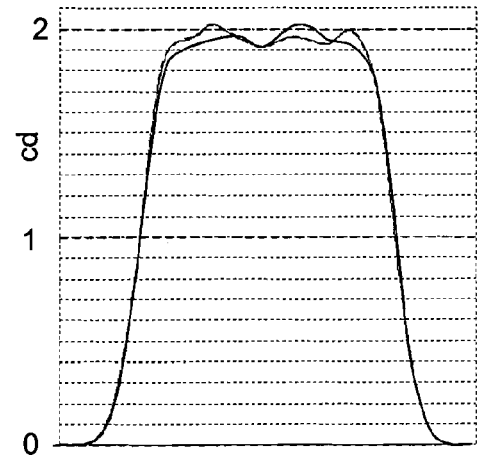
Figure 6Q:
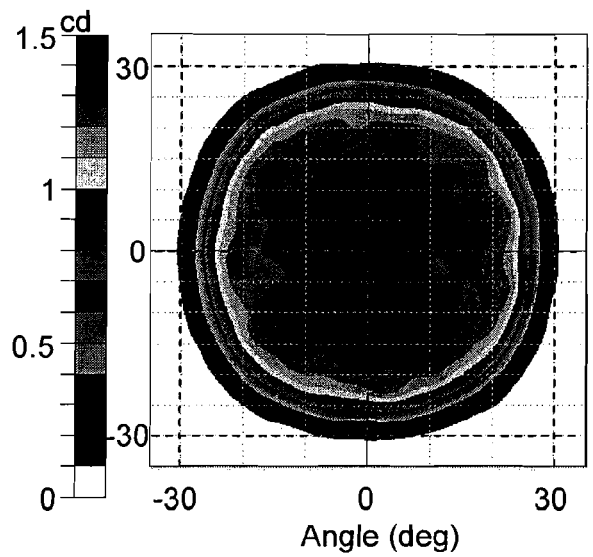
Figure 6R:
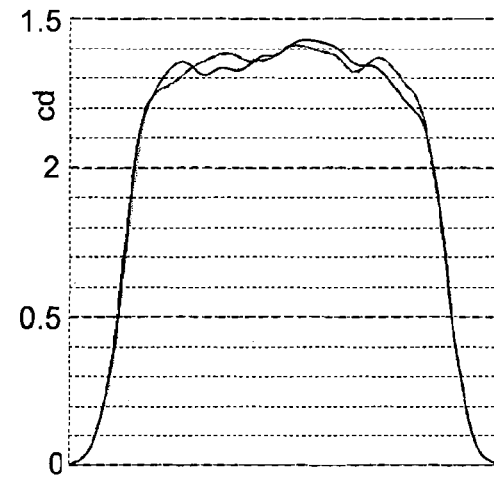
Figure 6S:
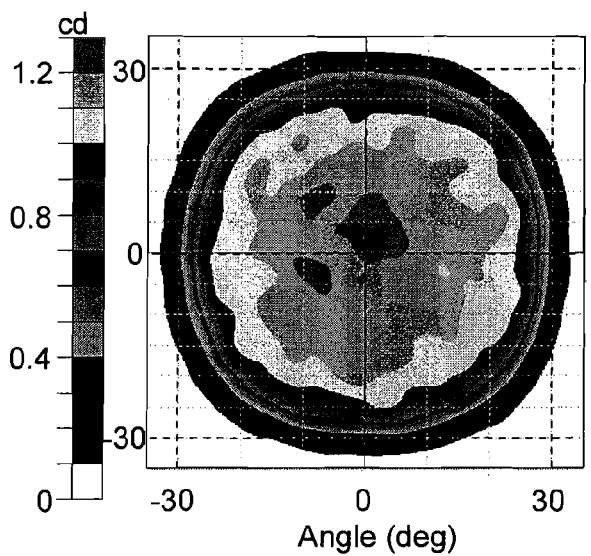
Figure 6T:
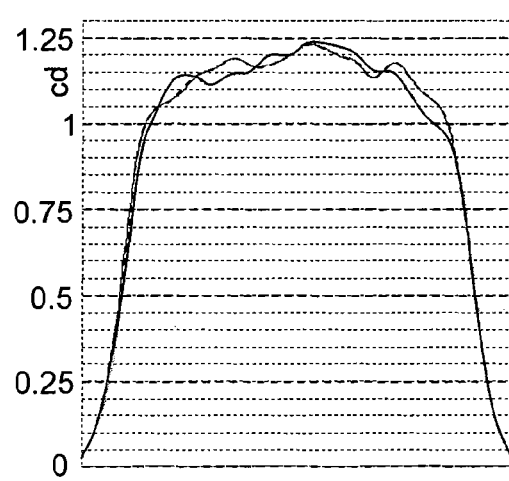
Figure 8C:
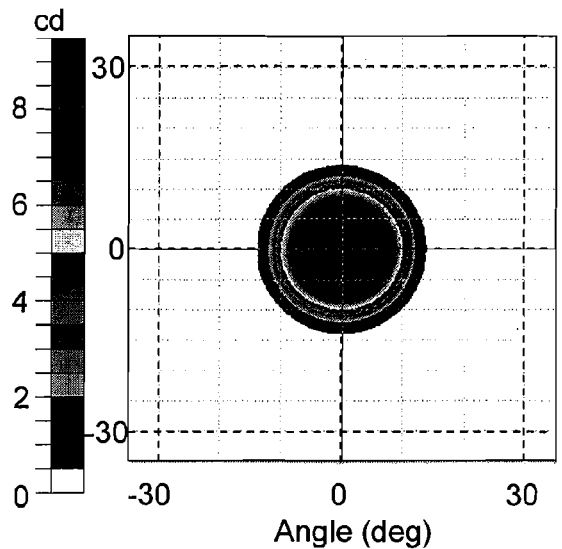
FIGS. 8A through 8V are charts showing in bullseye and graph form the angular distribution of light from the luminaire of FIGS. 7A and 7B at different zoom settings.
Figure 8D:
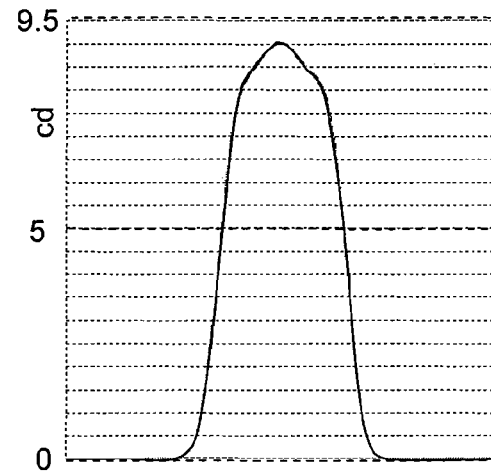
Figure 8E:
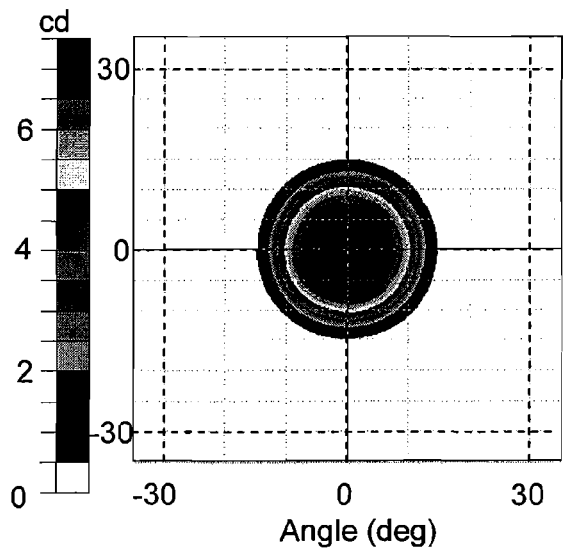
Figure 8F:
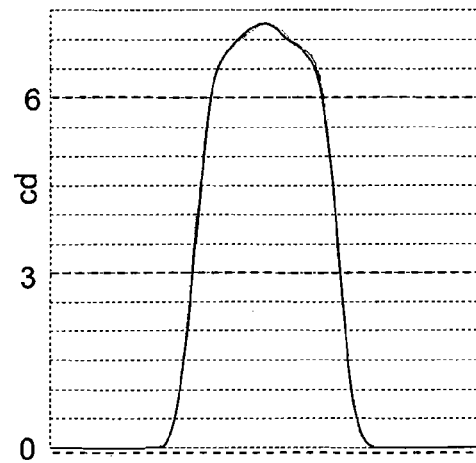
Figure 8G:
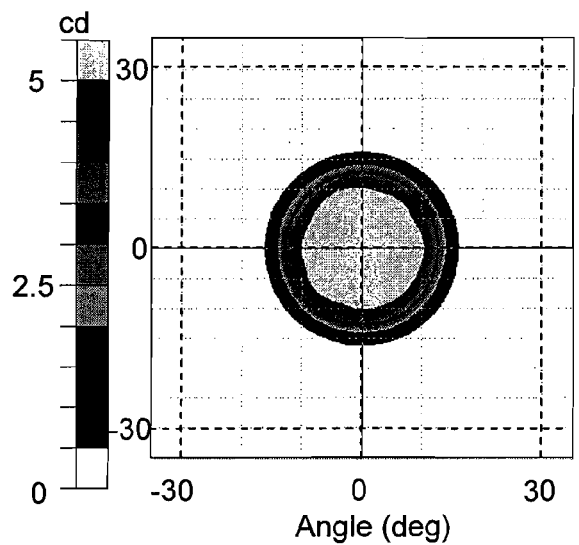
Figure 8H:
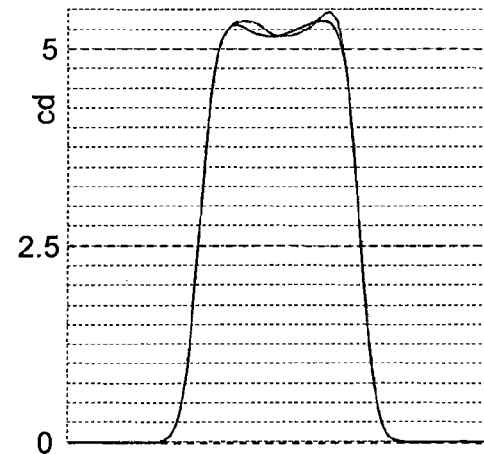
Figure 8I:
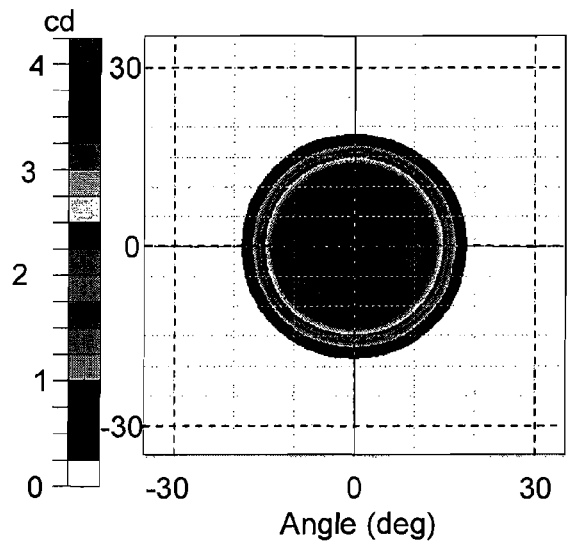
Figure 8J:
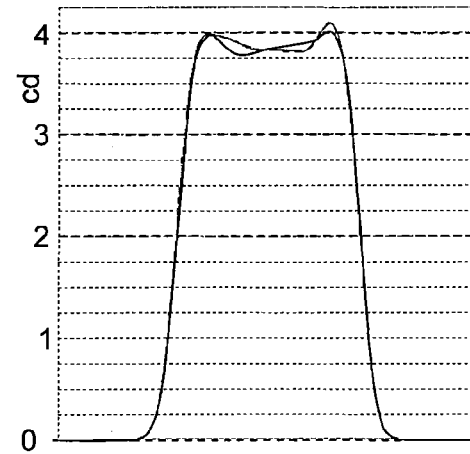
Figure 8K:
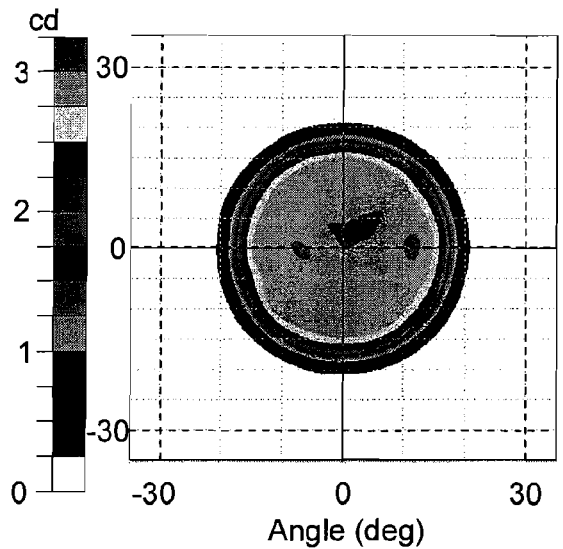
Figure 8L:
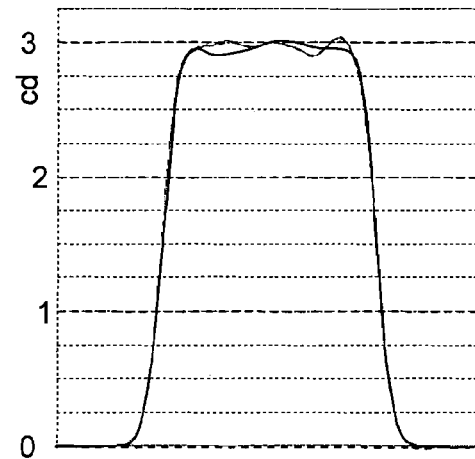
Figure 8M:
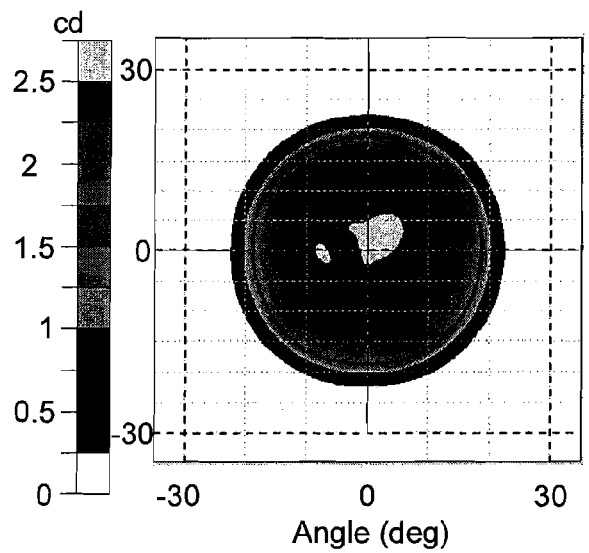
Figure 8N:
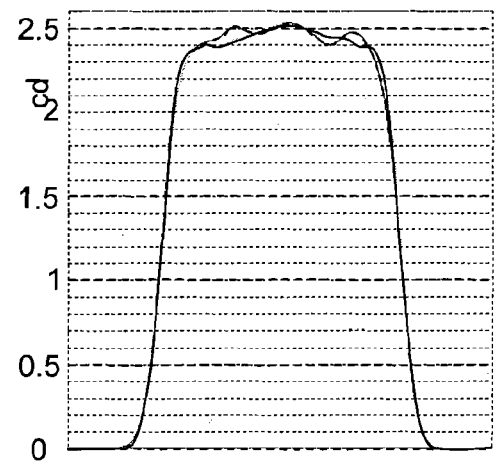
Figure 8O:
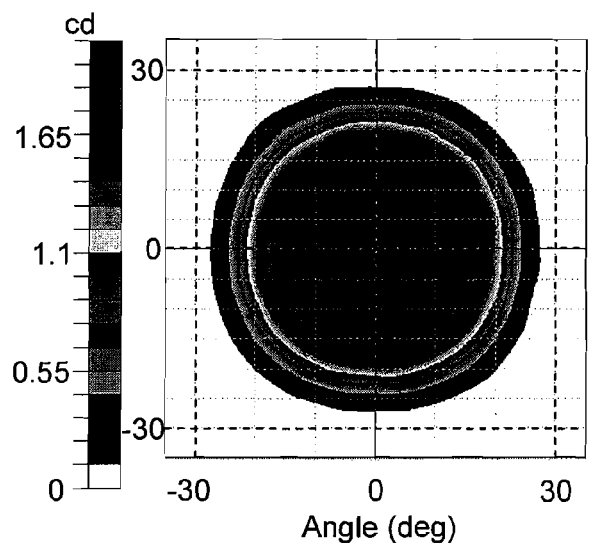
Figure 8P:
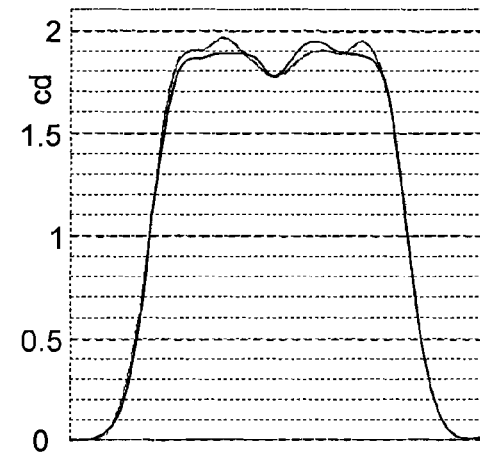
Figure 8Q:
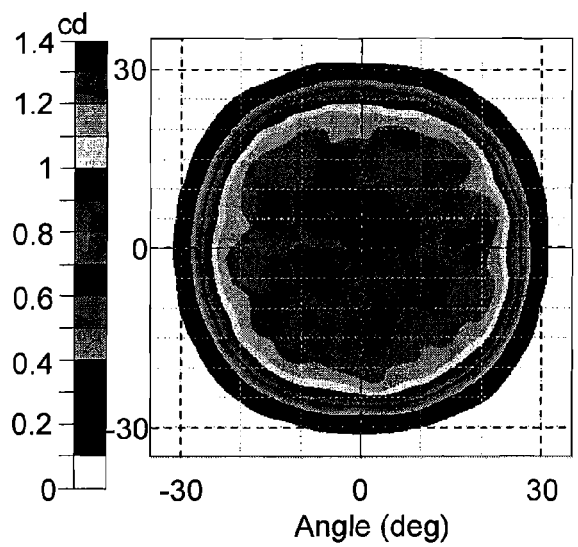
Figure 8R:
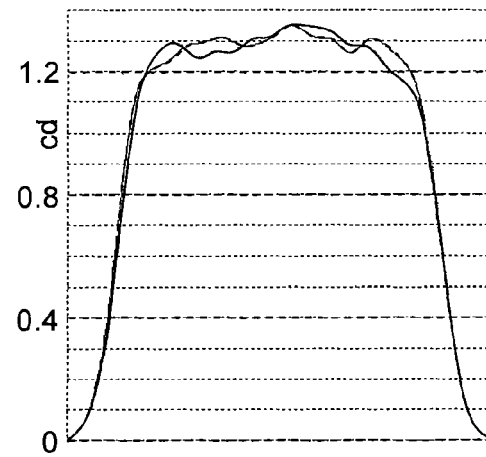

FIGS. 6A through 6T graphically show the zooming system's illumination performance while moving the pieces for the optic of FIG. 5. Each pair of charts (FIGS. 6A and 6B, etc.) shows first a contour plot of intensity against two-dimensional angular coordinates, and second a graph of intensity against angular coordinates along both the principal axes of the first chart. As may be seen from the steady progression between ten different zoom positions successively shown in FIG. 6, the geometry of FIG. 5 allows good results at positions intermediate between the defined retracted (FIG. 5C), first extended (FIG. 5B), and fully extended (FIG. 5A) positions. FIGS. 6A and 6B show the output in the configuration of FIG. 5A, in which the luminaire is fully extended, so that the source 55 sees all three mirrors, 52, 53, and 54, and lens 51. Successive pairs of charts show the beam gradually broadening as the second mirror 53, together with the CPC 54 and the source 55, is advanced towards the lens 51 so that the primary mirror 52 gradually becomes inactive. Once the second mirror 53 reaches the lens 51, and the largest mirror 52 becomes completely inactive, if further broadening of the beam is desired the CPC 54, together with the source 55, is advanced further towards the lens 51. The second mirror 53 thereby gradually becomes inactive. In the final position shown in FIG. 5C, the CPC 52 reaches the lens surface 51F, both the second mirror 53 and the largest mirror 52 are inactive. That beam pattern is shown in FIGS. 6S and 6T.

Structures and results similar to those respectively shown in FIGS. 5 and 6 can be accomplished by luminaire 70 of FIG. 7A and FIG. 7B. Its lens 71 has the curved surface 71C facing inwards towards the light source, as shown in FIGS. 7A and 7B. The structure and function of the luminaire 70 may otherwise be close to those of the luminaire 50 previously described, given the same overall component dimensions and lens curvature.

The zoom effect of successive positions of zoomable luminaire 70 of FIG. 7 is shown in the successive stages of FIGS. 8A and 8B through FIGS. 8U and 8V, which are analogous to FIGS. 6A through 6T.

The curved shapes of mirrors 52 and 53 pose manufacturing difficulties in the application of a reflective coating to the interior of an injection molded part. Pure cones with their straight-edge profiles, in contradistinction, are developable surfaces, so that a circular section of adhesively backed thin-film coating, cut from a low-cost roll, will fit a cone. Simple combinations of mirrored cones and plano-convex spherical lenses are surprisingly effective collimators. A perspective view of a preferred embodiment that was successfully reduced to practice is shown in FIG. 9, wherein zoomable illuminator 100 comprises LED-package light source 101, primary reflector piece 102 (the lower reflector piece as shown in FIG. 9), secondary reflector piece 103 (the upper reflector piece as shown in FIG. 9), and outer lens 104 conjoined thereto.

Figure 9:
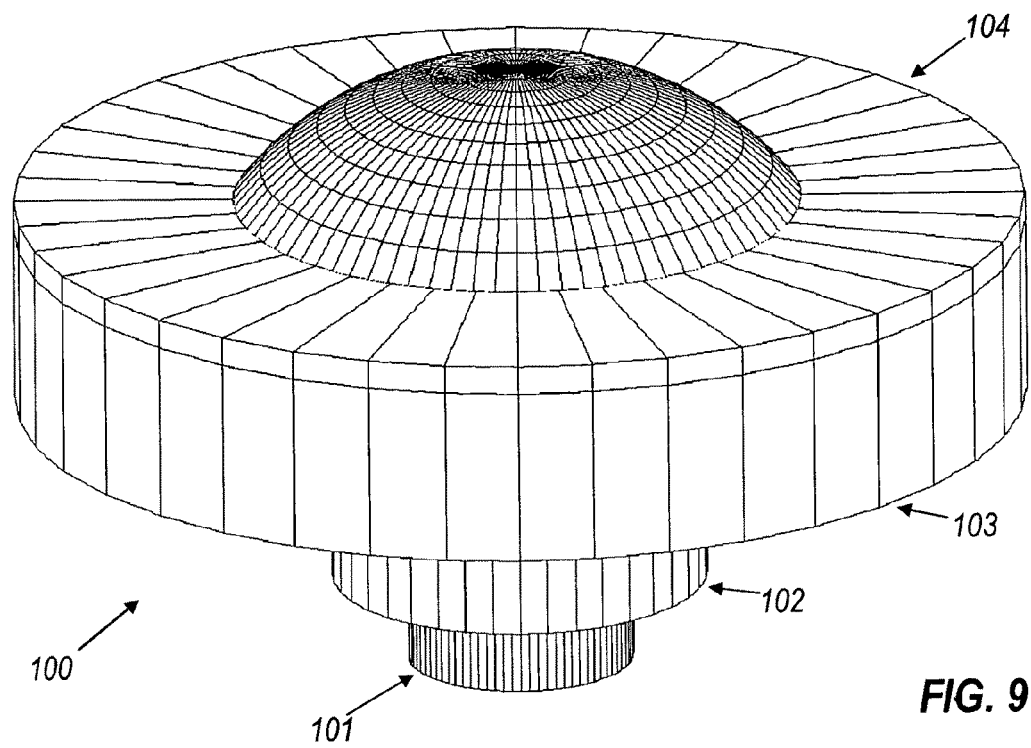
FIG. 9 is a perspective view of a further embodiment of a zoomable spotlight.
Figure 10:
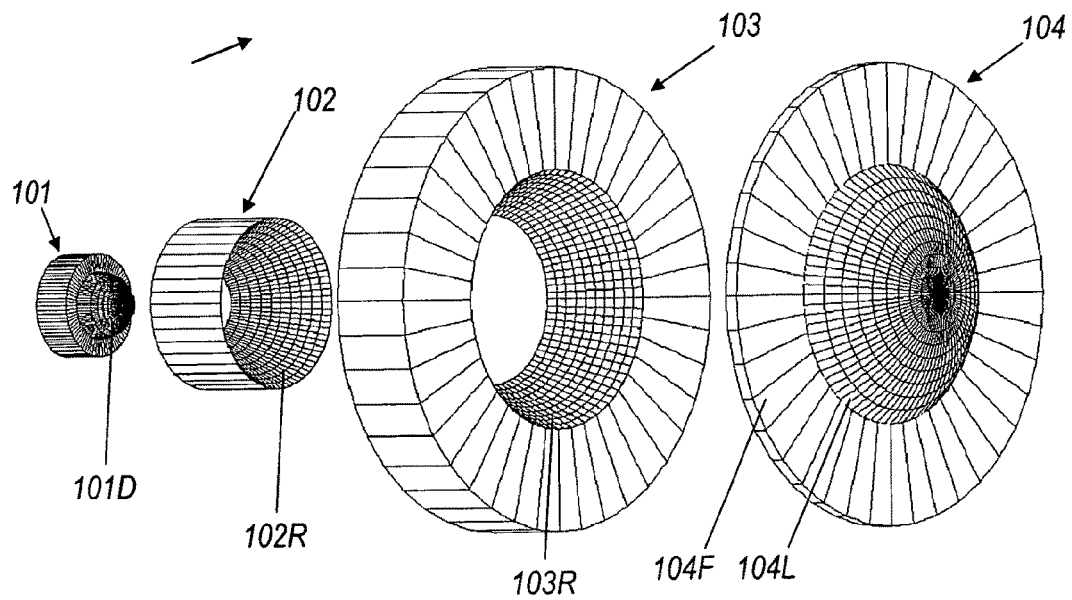
FIG. 10 is an exploded view of the spotlight shown in FIG. 9.

FIG. 10 shows an exploded view of the principal components of the illuminator 100 of FIG. 9. Light source 101 comprises light-emitting dome 101D, which may be hemispherical. Lower reflector piece 102 comprises on its inner surface a mirrored conical lower reflector 102R. Upper reflector piece 103 comprises on its interior surface a mirrored conical upper reflector 103R. Upper lens 104 comprises externally lensed surface 104L.

Figure 11:
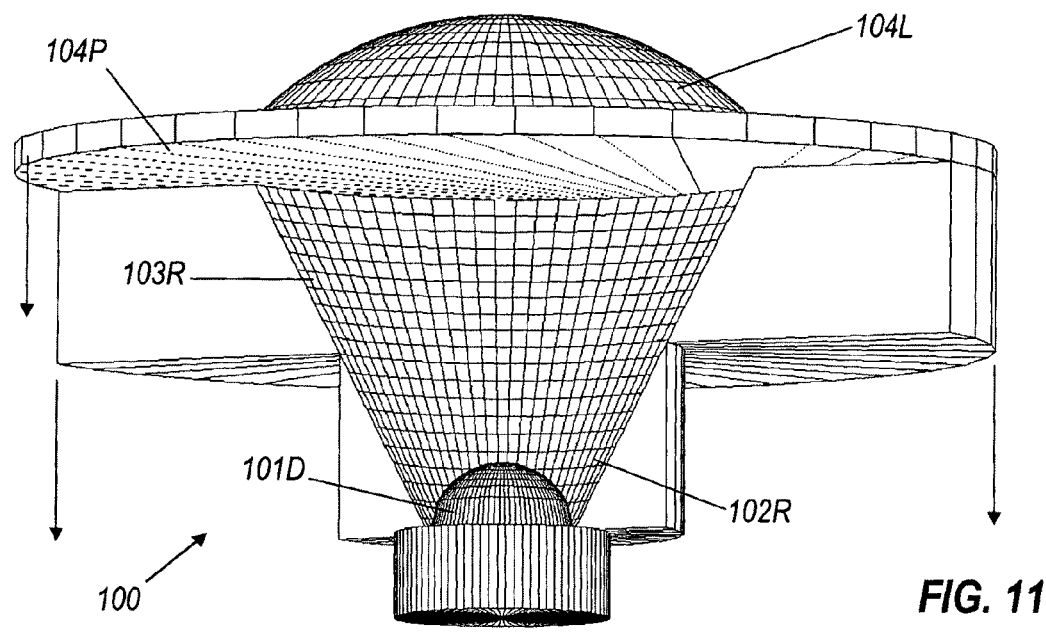
FIG. 11 is a cutaway perspective view of the spotlight of FIG. 9, extended.

FIG. 11 shows a cutaway perspective view of light source 100, in a fully extended configuration for the purpose of producing of its narrow beam. Dome 101D is installed at the small end of lower reflector 102R, which can be seen to be expanding upwards. As shown in FIG. 11, the hemispherical light-emitting surface of dome 101D is within primary reflector piece 102, with the inlet aperture of primary reflector piece 102 abutting a flat surface of light source 101, from which hemispherical dome 101D rises. Upper reflector 103R is positioned contiguously to lower reflector 102R and so sized and shaped as to be tangential thereto, producing the optical equivalent of a single conical reflector. Lens 104 and upper reflector piece 103 are conjoined along the periphery of bottom planar surface 104P. Thus conjoined, lens 104 and upper reflector piece 103 move downward together relative to lower reflector piece 102 and light source 101 into the retracted configuration, and upward into the extended configuration.

Figure 12:
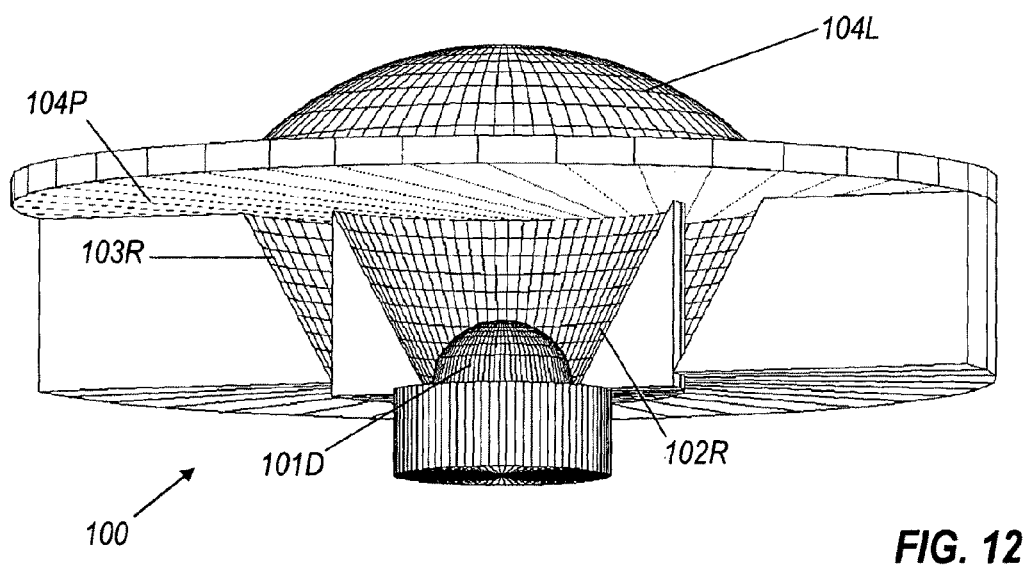
FIG. 12 is a cutaway perspective view of the spotlight of FIG. 9, retracted.

FIG. 12 shows a cutaway perspective view of light source 100, in the retracted configuration for the purpose of producing of its wide beam. Bottom planar surface 104P of lens 104 is in contact with the top or exit end of lower reflector piece 102, which is now the only active reflector.

Figure 13:
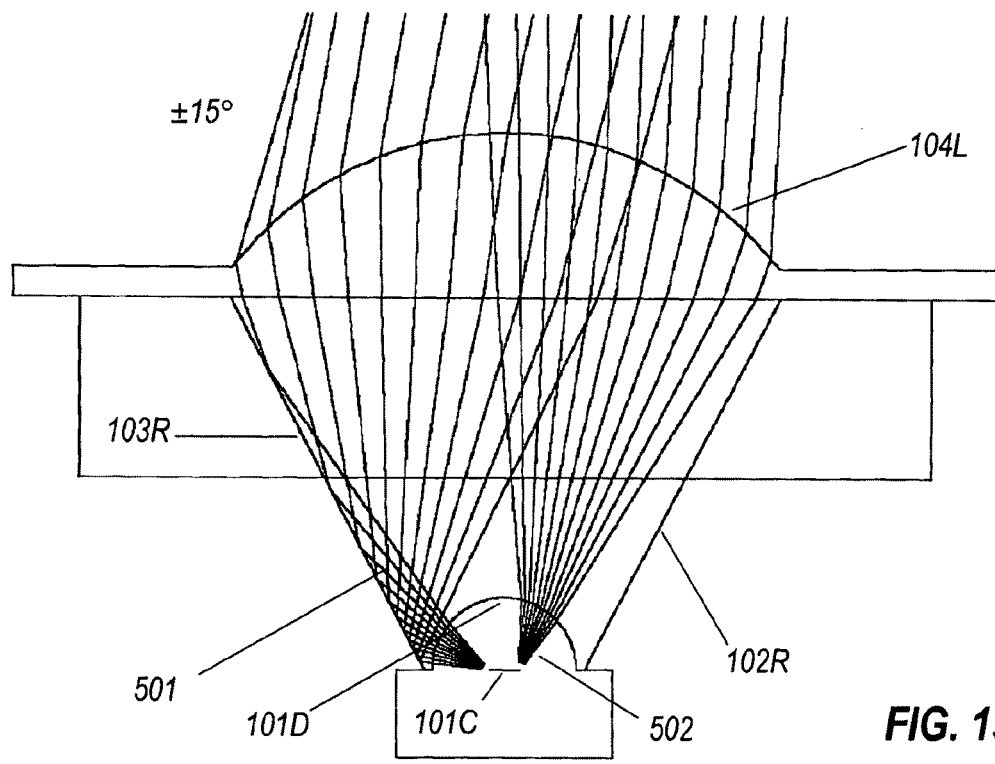
FIG. 13 is a cross-sectional ray diagram of the spotlight as shown in FIG. 11.

FIG. 13 is a cross-sectional diagram showing the formation of the narrow beam when light source 100 is extended, as in FIG. 11. The fan of rays 501 shown emitted to the left side of chip 101C in FIG. 13 illustrates rays emitted onto reflectors 102R and 103R, which thereupon reflect the rays upwards through the lens 104. The fan of rays 502 shown emitted to the right side of chip 101C in FIG. 13 illustrates rays emitted directly to the lens 104. In reality, rays in both fans are emitted at all azimuthal directions. The direct and reflected rays combine to produce a ±15° beam.

Figure 14:
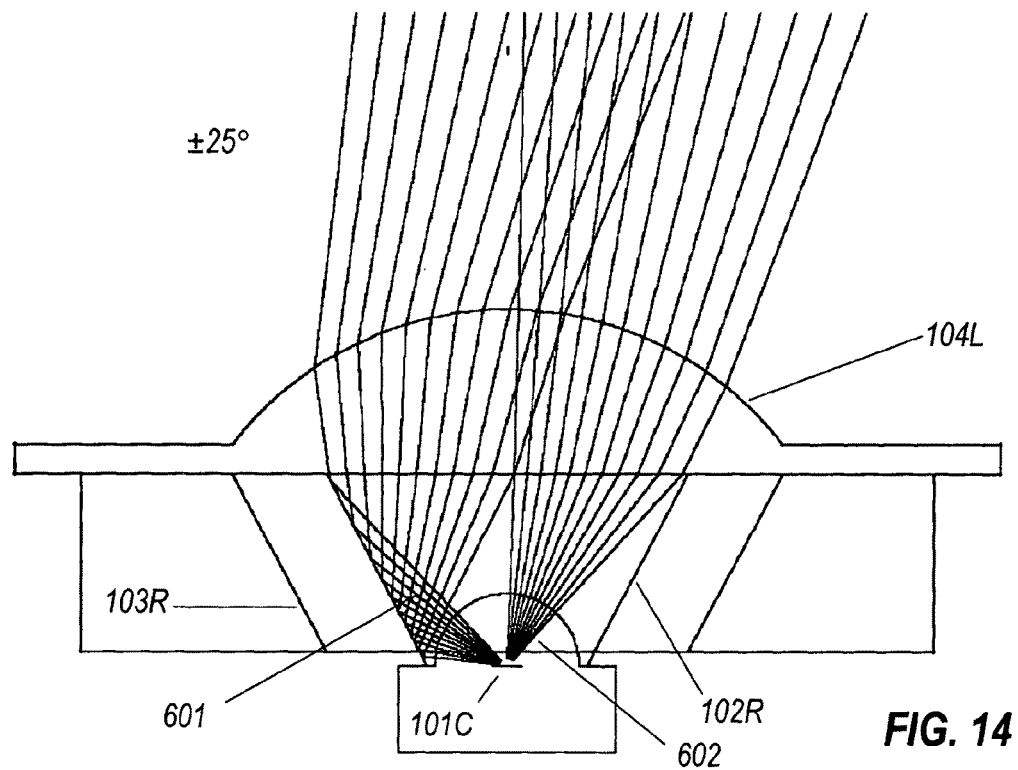
FIG. 14 is a cross-sectional diagram of the spotlight as shown in FIG. 12.

FIG. 14 is a cross-sectional diagram similar to FIG. 13, but showing the formation of the wide-beam option when light source 100 is retracted, as shown in FIG. 12. Chip 101C emits left ray-fan 601 onto reflector 102R, which thereupon reflect the rays upwards through the lens. Right ray-fan 602 goes directly to the lens. The direct and reflected rays combined to produce a ±25° beam. The different position of lens 104 relative to chip 101C, as well as the different cut-off angle between the reflected ray fan 601 and direct ray fan 602, affects the angle of spread of the exiting beam.

Although terms of orientation such as "upper" and "lower" have been used, generally with the light source at the "lower" end of the luminaire and the light beam emerging from the "upper" end, the luminaires described may be used in any orientation. For example, a ceiling-mounted luminaire will usually have the light source uppermost and the emerging light beam directed downwards.

In the mirror lens embodiments described and illustrated, the lens is mounted flush to the exit aperture of the secondary mirror section, or the last and outermost of the secondary mirror sections, if there are several. In the retracted configuration and any less than fully extended configuration, the exit end of the outermost active mirror section abuts the inlet side of the lens. For example, in FIG. 12 the primary mirror 102R is the only active mirror section, and abuts the lens 104. In a position intermediate between FIGS. 11 and 12, the secondary mirror 103R is partially active and is the last active mirror section, abutting the lens 104, whereas the inner mirror 102 is spaced from the lens 104. There is a short amount of travel close to the position of FIG. 12, from where the smaller, primary mirror 102R separates from the lens 104 until the cone of light from the primary mirror 102 reaches the lip of the secondary mirror 103R, corresponding to the dotted line position 21 in FIG. 2 or 22 in FIG. 3. However, that short amount of "lost" travel with no change in the active mirror configuration does not affect the basic principle underlying the embodiments.

As additional examples, see the position of the largest mirror 52 in FIG. 5A and between FIGS. 5A and 5B, the largest mirror 72 in positions near to FIG. 7B, and the smaller secondary mirror 53 in FIG. 5B and between FIGS. 5B and 5C. This has the advantage of ensuring a predictable positioning of the active mirror surfaces relative to the lens in a simple manner. Any inactive mirror sections (smaller secondary mirror in FIG. 5C) may for mechanical simplicity remain parked abutting the lens. However, that is not necessary, and the mirror sections in FIG. 5C or FIG. 7B could have a position similar to that shown in FIG. 2, in which the exit apertures of the outer sections are above the exit apertures of the inner sections, but below the cone of the beam emerging from the last active section. The latter position eliminates the "lost" travel mentioned above.

In an intermediate position between two of the defined positions, the inner mirror section or sections may be contiguous end to end starting at the light source and the outer mirror section or sections may abut the lens if there is a lens. The outermost active mirror section has only part of its length nearest the lens or exit end active, and is the only active mirror section that is not contiguous end-to-end with the preceding mirror section. That configuration is optically predictable and mechanically simple to achieve, but other configurations are possible.

The movement of the different sections relative to one another has been described. In many practical embodiments, either the source or the outermost mirror section will be mounted to a fixed, adjustable, or movable support, and the other sections will be moved relative to that mounted section.

For simplicity, the embodiments described are circularly symmetric about the center of the light beam. However, other shapes are of course possible.

Although CPC and conical reflectors have been described, other shapes may be used to embody the same zoom principle.

Reference is made to an earlier paper by one of us, Julio Chaves and Manuel Collares Pereira, "Variable geometry nonimaging optics devices", Proceedings of the SPIE conference on Nonimaging Optics: Maximum Efficiency Light Transfer VI, San Diego, Calif., USA, July 2001, which is incorporated herein by reference in its entirety. That paper describes in more detail optical geometries in the 2D case for certain variable-angle nonimaging optical devices.

Although certain specific embodiments have been described, the skilled reader will understand how features of different embodiments may be combined in a single device.

The preceding description of the presently contemplated best mode of practicing the invention is not to be taken in a limiting sense, but is made merely for the purpose of describing the general principles of the invention. The full scope of the invention should be determined with reference to the claims.

| U.S. PATENT DOCUMENTS | | | | |
|---|---|---|---|---|
| 4,101,957 | July 1978 | Chang | 362/268 | Zoom Operating Light (Mirror & 2 Lenses) |
| 4,293,892 | October 1981 | Plummer | 362/17 | Zoom Light Apparatus (Reflector & 2 Lenticulars) |
| 4,519,020 | May 1985 | Little | 362/268 | Variable Magnification Stage Light (Mirror & 2 Lenses) |
| 4,745,531 | May 1988 | Leclercq | 362/281 | Adjustable Lighting Device (Refl, Asphere, 2 Lenses) |
| 4,823,243 | April 1989 | Weigert | 362/281 | Miniature Spotlight (Mirror & 2 Lenses) |
| 5,068,768 | November 1991 | Kobayashi | 362/61 | Variable Light Distribution (Mirror, Lens, 2 Lenticulars) |
| 5,138,540 | August 1992 | Kobayashi | 362/268 | Variable Light Distribution |
| 5,243,459 | September 1993 | Winston | 359/362 | Nonimaging Radiant Energy (Lens & Hyperbolic Mirror) |
| 5,303,125 | April 1994 | Miller | 362/32 | Fiber Optic Spotlight (Fiber, Lens & Fold Mirror) |
| 5,584,568 | December 1996 | Corbasson | 362/268 | Variable Illuminated Field (Light Bulb & 2 Lenses) |
| 5,775,799 | July 1998 | Forkner | 362/268 | Zoomable Beamspreader (Linear Refl & Dual Sines) |
| 6,004,007 | December 1999 | Weigert | 362/268 | Adjustable Spotlight (Refl & 2 Lenses) |
| 6,092,914 | July 2000 | Esakoff | 362/268 | Zoom Lighting (Mirror & 2 Lenses) |
| 6,200,011 | March 2001 | Miller | 362/554 | Spotlight Luminaire |

-continued

| U.S. PATENT DOCUMENTS | | | | |
|---|---|---|---|---|
| 6,282,027 | August 2001 | Hough | 359/618 | (Mirror & Lens)<br>Zoomable Beamspreader<br>(Refl, Pos & Neg Lens) |
| 6,290,368 | September 2001 | Lehrer | 362/187 | Portable Light<br>(LED & 2 Lenses) |
| 6,400,905 | June 2002 | Tenmyo | 396/175 | Variable Angle Lighting<br>(Lin Refl & 3 Lenses) |
| 6,499,862 | December 2002 | Weigert | 362/268 | Adjustable Spotlight<br>(Mirror & 2 Lenses) |
| 6,575,598 | June 2003 | Weigert | 362/268 | Focusable Spotlight<br>(Mirror, Neg Lens & Fr Lens) |
| 6,746,124 | June 2004 | Fischer | 353/43 | Zoomable Flashlight<br>(Mirror & 2 Lenses) |
| 6,764,197 | July 2004 | Zemar | 362/159 | Spotlight (Mirror & Lens) |
| 6,809,869 | October 2004 | Hough | 359/626 | Zoomable Beamspreader |
| 6,834,982 | December 2004 | Dedoro | 362/268 | Spotlight<br>(Arc Lamp, Refl, Asphere & Fr) |
| 6,986,593 | January 2006 | Rhoads | 362/308 | Zoom Method<br>(LED, Mirror & Lens) |
| 7,027,228 | April 2006 | Mikhailov | 359/623 | (Multi-Lenticular) |
| 7,066,622 | June 2006 | Alessio | 362/187 | (LED & 3 Lenses) |
| 7,172,319 | February 2007 | Holder | 362/341 | (LED & CPC) |
| 7,192,162 | March 2007 | Tanaka | 362/268 | Spotlight (3 Lenses) |
| 7,261,438 | August 2007 | Alessia | 362/268 | Adjustable Spotlight<br>(Light Bulb & 4 Lenses) |
| 7,295,379 | November 2007 | Tsai | 359/651 | LED Light Converging<br>(LED & Multiple Lenses) |

We claim:

1. A zoomable luminaire comprising:
   a source of light;
   a primary reflector with entry and exit apertures;
   at least one secondary reflector with entry and exit apertures;
   said source positioned to deliver light into said entry aperture of said primary reflector, and said primary reflector arranged to deliver said light at said exit aperture of said primary reflector;
   said luminaire having a retracted position for producing a beam of a first beam angle, wherein said primary reflector is nested within said at least one secondary reflector;
   said luminaire having at least one extended position for producing a beam of a second beam angle, wherein the exit aperture of said primary reflector is contiguous with the entry aperture of one said secondary reflector so that said light is delivered at said exit aperture of said one secondary reflector.

2. The zoomable luminaire of claim 1, wherein in said retracted position said at least one secondary reflector does not substantially affect the distribution of the light.

3. The zoomable luminaire of claim 1, wherein said at least one secondary reflector comprises at least two secondary reflectors, said luminaire having at least a first extended position in which the exit aperture of said primary reflector is contiguous with the entry aperture of a first of said at least two secondary reflectors and no other secondary reflector substantially affects the distribution of the light, and a second extended position in which the exit aperture of said primary reflector is contiguous with the entry aperture of the first secondary reflectors and the exit aperture of the first secondary reflector is contiguous with the entry aperture of a second of said at least two secondary reflectors.

4. The zoomable luminaire of claim 3 wherein, in any said retracted or extended position other than a fully extended position, a last active secondary reflector is nested within one or more retracted, inactive secondary reflectors.

5. The zoomable luminaire of claim 1, further comprising a lens attached to a last said secondary reflector.

6. The zoomable luminaire of claim 5, wherein in any said retracted or extended position other than a fully extended position, the exit aperture of a last active reflector abuts an entry surface of the lens.

7. The zoomable luminaire of claim 5, wherein the lens is a positive lens.

8. The zoomable luminaire of claim 1, wherein the light source is a hemispherical light emitter positioned within the primary reflector, with the flat side of the hemisphere substantially coplanar with the entry aperture of the primary reflector.

9. The zoomable luminaire of claim 1, wherein the reflectors are conical.

10. A zoomable luminaire comprising a light emitting hemisphere, a conical lower reflector with lower and upper apertures, a conical upper reflector with lower and upper apertures, and a positive lens with a lower and upper surface, said hemisphere positioned into said lower aperture of said lower reflector, said bottom surface of said lens in contact with said upper aperture of said upper reflector, said luminaire with a position of extension for producing a narrow beam and a position of retraction for producing a wide beam, said position of extension comprising the contiguity of said upper aperture of said lower reflector and said lower aperture of said upper reflector, said position of retraction comprising the contiguity of said upper aperture of said lower reflector with said lower surface of said lens, said position of retraction also comprising the nesting of said lower reflector within said upper reflector.

* * * * *